(12) United States Patent
Huang et al.

(10) Patent No.: US 10,955,969 B2
(45) Date of Patent: Mar. 23, 2021

(54) ACCESS CONTROL SYSTEM AND LIGHT GUIDE ASSEMBLY THEREOF

(71) Applicant: PIXART IMAGING INC., Hsin-Chu (TW)

(72) Inventors: Chao-Chien Huang, Hsin-Chu (TW); Hung-Ching Lai, Hsin-Chu (TW); Ting-Yang Chang, Hsin-Chu (TW); Yi-Hsien Ko, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 16/546,155

(22) Filed: Aug. 20, 2019

(65) Prior Publication Data
US 2020/0064947 A1 Feb. 27, 2020

Related U.S. Application Data

(60) Provisional application No. 62/720,276, filed on Aug. 21, 2018.

(51) Int. Cl.
*G06F 3/042* (2006.01)
*F21V 8/00* (2006.01)

(52) U.S. Cl.
CPC .......... *G06F 3/042* (2013.01); *G02B 6/0095* (2013.01)

(58) Field of Classification Search
CPC ...... G06F 3/042; G06F 3/0421; G06F 3/0428; G06F 3/0488; G06F 2203/04109; G06F 3/0304; G06F 3/0308; G02B 6/0033; G02B 6/006; G02B 6/005
See application file for complete search history.

(56) References Cited

U.S. PATENT DOCUMENTS

2016/0266695 A1* 9/2016 Bae ................... G06K 9/00053
2019/0212486 A1* 7/2019 Ahn ................... G02B 6/0058

* cited by examiner

*Primary Examiner* — Dennis P Joseph
(74) *Attorney, Agent, or Firm* — Li & Cai Intellectual Property (USA) Office (57) ABSTRACT

A light-guide assembly and an access control system are provided. The light-guide assembly is used as an interface for touch input. The light-guide assembly includes a light-guide element and a light source disposed on a lateral surface of the light-guide element. The light source emits a first light with a first wavelength. The light-guide element has an upper surface, a lower surface, and an inner layer that is made of a light-transmissive material. The first light enters the light-guide element through the lateral surface and propagates inside the light-guide element for reacting to the touch event occurring on the upper surface. A verification data used in an access control system is formed when the touch event is sensed and identified. A light-activation element of the assembly activates the first light propagating inside the light-guide element and produces a second light that is used to provide a visual effect.

10 Claims, 10 Drawing Sheets

ACCESS CONTROL SYSTEM AND LIGHT GUIDE ASSEMBLY THEREOF

CROSS-REFERENCE TO RELATED PATENT APPLICATION

This application claims the benefit of priority to U.S. Provisional Application No. 62/720,276, filed on Aug. 21, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to a light guide assembly, and in particular to a light guide assembly providing display and touch-sensitive technology according to light characteristics and an access control system utilizing the light guide assembly.

BACKGROUND OF THE DISCLOSURE

The conventional device used for lock control in a transportation vehicle or for an entry access control is generally a mechanical device such as a door lock and key. Further, an electronic lock that uses security code or biometric technology can also be used in an important institution or a modern building. Still further, digital access control technologies using wireless communication technology for pairing and authentication have undergone years of development. In addition, a keyless system is a common technology adopted for lock control in a modern vehicle.

SUMMARY OF THE DISCLOSURE

The disclosure is related to a light guide assembly and an access control system applying the light guide assembly. According to one embodiment of the disclosure, the light guide assembly includes a light guide element that is used as an interface for touch input. The light guide element has a lateral surface, an upper surface, a lower surface and an inner layer between the upper surface and the lower surface. A light source is disposed on the lateral surface and used to emit a first light with a first wavelength. The lateral surface receives the first light, and the first light propagates inside the inner layer of the light guide element. The first light is used for reacting to a touch event occurring on the upper surface.

The light guide assembly includes a light-activation element that is disposed on the upper surface or inside the inner layer. The light-activation element is used to receive the first light and the first light is activated to produce a second light with a second wavelength. The second wavelength is preferably different from the first wavelength. The second light therefore provides a visual effect.

Further, the inner layer can be made of a total-internal-reflection (TIR) material, and the first light propagates inside the inner layer by total internal reflection. When a touch event occurs, at least a part of the first light is turned toward the lower surface due to the behavior of total internal reflection of the first light being interfered at the touch position.

Preferably, the light-activation element can be formed in a specific arrangement on the upper surface or inside the inner layer. The light-activation element can be made of a photo-conversion nanomaterial, e.g. NaYF4:Yb,Er or phosphor that is used to absorb the light with the first wavelength so as to produce the light with the second wavelength. The second light can be used to mark one or more specific zones on the upper surface. In one embodiment of the disclosure, the every zone specifies a specific digital character.

In one embodiment of the disclosure, the light guide assembly includes a light guide element having an upper surface and a lower surface. The light guide element includes a first inner layer and a second inner layer between the upper surface and the lower surface. A lateral surface and a second lateral surface are provided. The first inner layer is closer to the upper surface than the second inner layer. A first light source is disposed on the first lateral surface for emitting a first light and the first lateral surface can receive the first light with a first wavelength. The first light propagates inside the first inner layer for reacting to a touch event occurring on the upper surface. A second light source is disposed on the lateral surface for emitting a second light. The lateral surface receives the second light with a second wavelength. The second light propagates inside the second inner layer for providing a visual effect.

The light guide assembly includes a light-path steering element that is disposed on the lower surface or the second inner layer. The light-path steering element is used to receive the second light and steer at least part of the second light to emit toward the upper surface for providing the visual effect.

Further, the first inner layer can be made of a total-internal-reflection material that allows the first light to propagate inside the first inner layer by total internal reflection. When a touch event occurs, at least a part of the first light is turned toward the lower surface due to the behavior of total internal reflection of the first light being interfered at the touch position.

The light-path steering element is such as the mentioned light-activation element that can form a text or a pattern in a specific arrangement on the lower surface or inside the second inner layer. The light-path steering element causes the second light to mark one or more specific zones on the upper surface.

In one further embodiment of the disclosure, the light guide assembly can be used as an interface for touch input. The light guide assembly includes a light guide element having at least one lateral surface, an upper surface, a lower surface, and an inner layer having a first inner layer and a second inner layer that are disposed between the upper surface and the lower surface. The at least one lateral surface is used to receive a first light with a first wavelength and a second light with a second wavelength. The first light propagates inside the first inner layer for reacting to a touch event occurring on the upper surface, and the second light propagates inside the second inner layer for providing a visual effect.

Further, the light guide assembly includes a light-path steering element that is disposed on the lower surface or the inner layer, and is used to receive the second light and steer part of the second light to emit toward the upper surface for providing the visual effect.

The access control system of the disclosure adopts the above-mentioned light guide assembly. The access control system includes a light source, e.g. the light source, and the light source can be disposed on a side of the lateral surface of the light guide element. The light source emits the first light, and the first light propagates inside the inner layer by total internal reflection. When a touch event occurs, at least a part of the first light is turned toward the lower surface. A light-activation element is also provided to utilize the second light to mark one or more specific zones on the upper surface.

The access control system includes a light sensor that can be disposed on a side of the lower surface of the light guide element. The light sensor is used to detect the first light and determine positions with respect to one or more touch events in response to the received first light. A controller is used to perform a verification procedure for access control according to the positions corresponding to the one or more touch events.

Preferably, the access control system can be disposed on a vehicle, and the light guide assembly can be disposed on a transparent window of the vehicle.

Preferably, the verification procedure for access control includes receiving touch positions with respect to multiple touch events occurring on the upper surface. The touch positions are formed by a gesture, a pattern made by a stroke, or an alphanumeric combination performed by a user. The touch positions are converted into a plurality of coordinate positions that are used to compare with a security verification data stored in a memory. When the verification passes, an access control circuit is driven to unlock a door lock, or otherwise the door lock will not be unlocked if the verification fails.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a light guide assembly, and an access control system using the light guide assembly. The light guide assembly provides a solution for access control that is required by a vehicle and a place. The light guide assembly allows a user to open or close a door lock without any physical key or radio-frequency device. In addition, the access control system using the light guide assembly can be configured to have multiple security verification data that provides more flexible control procedures for controlling the door lock without the limitations in the traditional methods.

Figure 1:
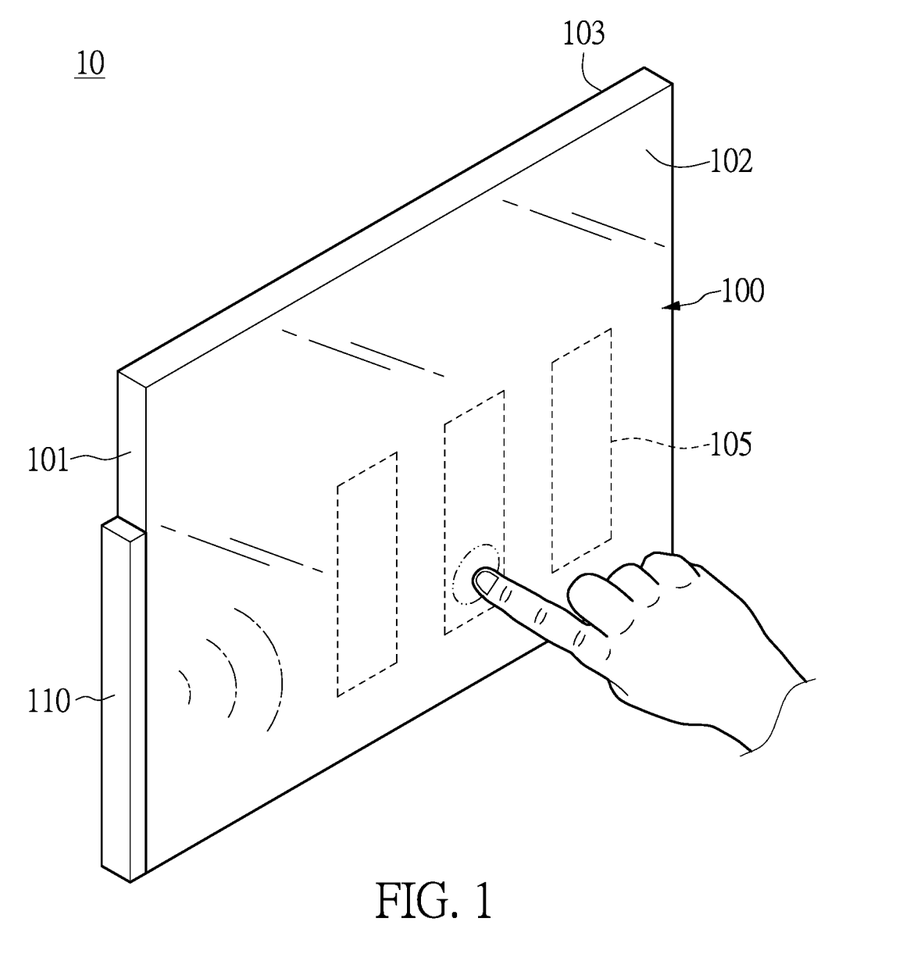
FIG. 1 is a schematic diagram depicting a light guide assembly according to one of the embodiments of the disclosure.

The light guide assembly can be referred to as an exemplary example shown in FIG. 1. A light guide assembly 10 is shown in the schematic diagram. The light guide assembly 10 acts as an interface for touch input. The main components of the light guide assembly 10 include a light guide element 100 having a lateral surface 101, an upper surface 102, a lower surface 103 and an inner layer between the upper surface 102 and the lower surface 103. The inner layer forms as a main structure of the light guide element 100 that can be made of a light-transmissive material such as glass and acrylic. The lateral surface 101 receives a first light with a first wavelength, and the first light is emitted from a first light source 110 disposed next to the lateral surface 101. The first light propagates inside the light guide element 100 and is used to react to a touch event occurring on the upper surface 102. As shown in the diagram, a user can touch the upper surface 102 of the light guide element 100 with his fingers. Therefore, the first light propagating inside the light guide element 100 is interfered by the touch event and is reflected to form a reflective light. The reflective light is received and processed by a light sensor (not shown in this diagram) so as to identify the touch event.

The light guide assembly 10 includes a light-activation element 105 that can be configured as a text or a pattern formed on the upper surface 102 or inside the inner layer of the light guide element 100. When the first light propagates inside the light guide element 100, the light-activation element 105 can receive the first light and activate a second light with a second wavelength. The second light is used to provide a visual effect. It should be noted that the second wavelength can be different from the first wavelength.

According to one of the embodiments of the disclosure, the first light can be an invisible light that is generally invisible to the human eyes. The invisible light is such as an infrared light or an ultraviolet light. In an exemplary example, the human eyes cannot see the first light under an initial state. However, when the first light propagating inside the light guide element 100 reaches the light-activation element 105, the material property of the light-activation element 105 can react to the first light and activate the second light. The second light is preferably a visible light that is visible to the human eyes. The light-activation element 105 activates the second light to reveal the text or the pattern.

The light-activation element 105 can be a photo-conversion nanomaterial that is used to absorb the first wavelength light, e.g. the first light, and activate the light with the second wavelength, e. g. the second light. The material for the light-activation element 105 can be NaYF4:Yb,Er or phosphor that is doped with a pattern onto a surface of the light guide element 100. The pattern can be revealed on the surface of the light guide element 100 once the material is activated.

According to one of the embodiments of the disclosure, the light-activation element 105 can be configured with a specific arrangement. The light-activation element 105 allows the second light to mark one or more zones on the upper surface 102 so as to reveal the text, e.g. alphanumeric characters, or the pattern.

For example, the one or more zones can be used to guide a user to input a letter or a number by a touch gesture. Each of the zones specified by the light-activation element 105 corresponds to a specific digital character so as to reveal the images of the text or pattern on the light guide element 100. Multiple digital characters can be arranged to form a sequence of numbers or a string. Further, the light-activation element 105 can be configured as a set of touchable virtual buttons and a light sensor can identify an order of the sequence of number or the string.

Figure 2:
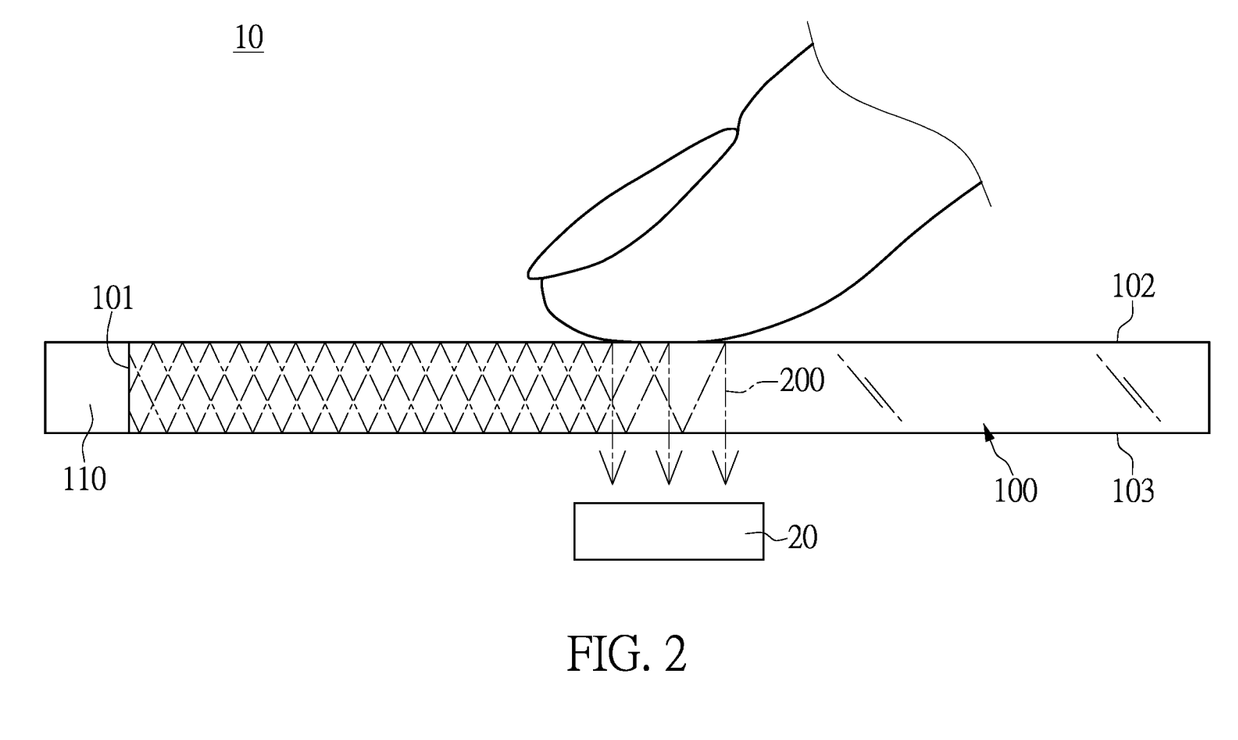
FIG. 2 is a schematic diagram depicting a touch control performed through the light guide assembly in one embodiment of the disclosure.

FIG. 2 is a schematic diagram depicting a touch control performed through the light guide assembly in one embodiment of the disclosure. A schematic sectional view of the light guide assembly 10 is shown in the diagram.

According to one embodiment of the light guide assembly 10 of the disclosure, the inner layer of the light guide element 100 can be made of a total-internal-reflection material. The inner layer acts as a waveguide. The light source 110 emits a first light that propagates inside the inner layer of the light guide element 100 by total internal reflection. Further, the first light propagates inside the light guide element 100 from the lateral surface 101 toward the other lateral surface. When any touch event occurs, such as a position touched by a finger (or a specific object) on the upper surface 102, the first light propagating inside the inner layer is interfered by the finger touching the upper surface 102. A reflective light 200 is therefore formed, in which at least part of the first light is reflected toward the other side, e.g. to the lower surface 103. The reflective light 200 is therefore received by a light sensor 20.

A series of continuous touch events can be made by a gesture, a pattern made by a stroke, or an alphanumeric combination performed by the user. When the continuous touch events occur, the continuous reflective light 200 are sensed by the light sensor 20. After identification, a verification data for the verification procedure is generated.

Figure 3:
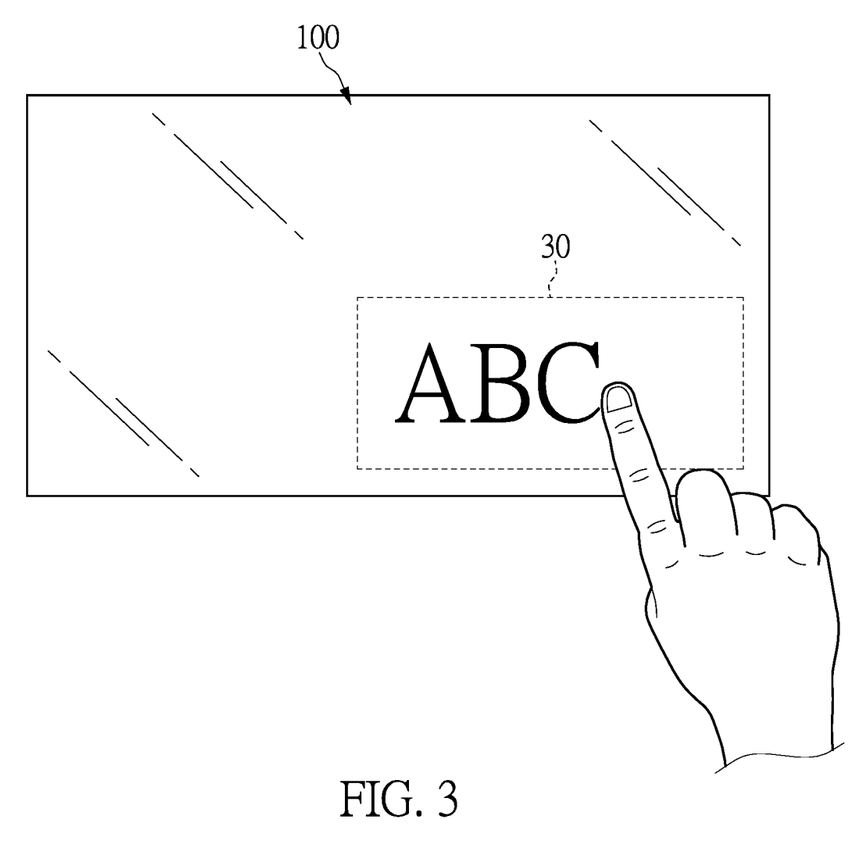
FIG. 3 schematically shows a circumstance where the light guide assembly indicates a touch area provided for touch control in one embodiment of the disclosure.

Reference is made to FIG. 3 that shows a schematic diagram depicting a circumstance where a light guide assembly indicates a touch area 30 for performing a touch input. A user performs handwriting on the touch area 30 over a light guide element 100. For the purpose of access control, a moving finger generates a series of touch events for forming a series of reflective lights that originally propagate inside the light guide element 100. A verification data is formed after the light sensor senses the reflective lights. The verification data is used to compare with a security verification data.

In should be noted that the security verification data can be the user's handwriting pattern or text, or the letters, numbers or any combination thereof formed through touching the virtual buttons.

The touch area formed on the light guide element 100 can be defined by the light sensor 20. The light sensor 20 is used to receive an image specified by a specific area, and to sense an event revealed within the area. An input data can be identified according to the positions or the trajectories of the touch events. The mentioned area is defined as the touch area 30 on the upper surface 102 of the light guide element 100.

Figure 4A:
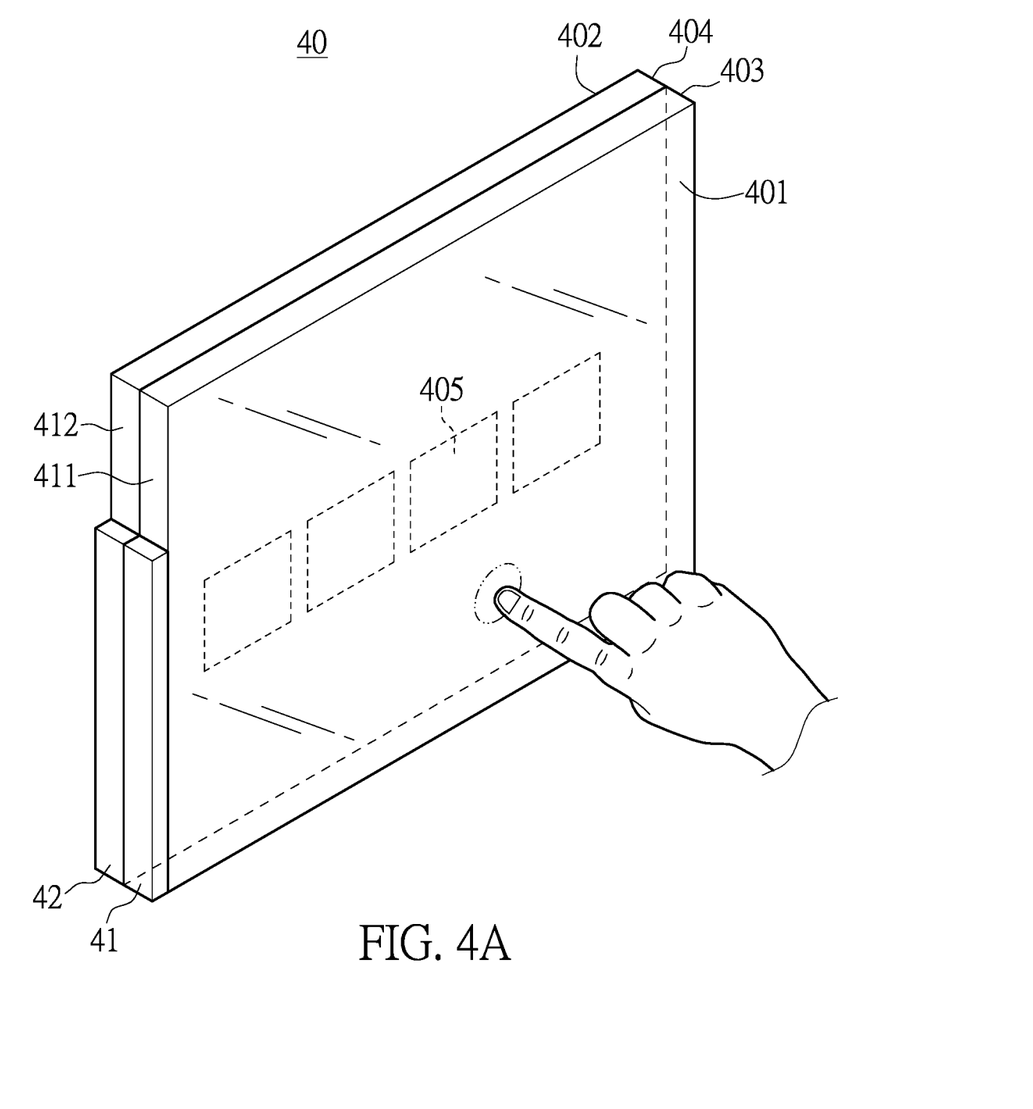
FIG. 4A is a schematic diagram depicting a light guide assembly according to another embodiment of the disclosure.

FIG. 4A is a schematic diagram depicting a light guide assembly according to one embodiment of the disclosure.

A light guide assembly 40 is shown in the diagram. The light guide assembly 40 acts as an interface for touch input. The main portion of the light guide assembly 40 is made of two layers of light-transmissive materials. A first inner layer 403 and a second inner layer 404 form a light guide element that is the main portion of the light guide assembly 40. The light-transmissive material is such as glass or acrylic. The light guide element has an upper surface 401 and a lower surface 402. The first inner layer 403 and the second inner layer 404 are disposed between the upper surface 401 and the lower surface 402. As compared with the second inner layer 404, the first inner layer 403 is closer to the upper surface 401. In other words, an external surface of the first inner layer 403 forms the upper surface 401 of the light guide element, and the external surface of the second inner layer 404 forms the lower surface 402 of the light guide element.

As shown in the diagram, a first light source 41 can be disposed on a first lateral surface 411 of the first inner layer 403 and is used to emit the first light propagating inside the first inner layer 403. A second light source 42 can be disposed on a second lateral surface 412 of the second inner layer 404 and is used to emit the second light propagating inside the second inner layer 404.

The first light source 41 emits the first light with a first wavelength. When the first light enters the first inner layer 403 via the lateral surface 411, the first light is used to react to a touch event occurring on the upper surface 401 while propagating inside the first inner layer 403.

According to one embodiment of the disclosure, the first inner layer 403 is made of a total-internal-reflection material. The first light can propagate inside the first inner layer 403 by total internal reflection. If any touch event occurs, e.g. a specific object touches the upper surface 401 of the first inner layer 403, the first light propagating inside the first inner layer 403 is activated and changes its direction. When the first light propagates by total internal reflection, the behavior of total internal reflection is interfered by the touch event and at least a part of the first light is turned toward the lower surface 402. The turned light can be received by a light sensor disposed on a side of the lower surface 402, and the touch event can be identified. The first light can be a visible light with a specific wavelength. The first light will not be seen by the user when the first light propagates inside the total-internal-reflection material. However, the light can be sensed by the light sensor since the behavior of total internal reflection of the light is interfered by a specific object.

The second light source 42 emits the second light with a second wavelength. The second light enters the second inner layer 404 via the lateral surface 412. The second light propagating inside the second inner layer 404 is preferably an invisible light that is generally invisible to the human eyes. A light-path steering element 405 is used to convert the second light to a light that can provide a specific visual effect. The second light can be converted to the light with a visible light wavelength.

The light-path steering element 405 is disposed on the lower surface 402 or inside the second inner layer 404 of the light guide element. The light-path steering element 405 is used to receive the second light propagating inside the second inner layer 404. The property of the material of the light-path steering element 405, or including surface structure, can steer part of the second light toward the upper surface 401. A user outside the upper surface 401 can therefore see the light with the specific visual effect.

According to one of the embodiments of the disclosure, the light-path steering element 405 can be configured in a specific arrangement that is used to mark one or more specific zones on the upper surface 401 of the second light. Every specific zone specifies a specific digital character. For example, since the light-path steering element 405 is configured to be a text, e.g. a letter or a number, or a pattern, the mentioned visual effect means the text or pattern revealed by a light with a specific wavelength.

In one practical application for the light guide assembly of the disclosure, as shown in FIG. 4A, a system using the light guide assembly is such as an access control system. The system shows a specific text or pattern to a user. The text or the pattern is formed when the light-path steering element 405 disposed on the lower surface 402 or inside the second inner layer 404 steers part of the second light toward the user. The text or pattern is used to prompt the user to input his security code. In the meantime, the first light source 41 emits the first light to be propagated inside the first inner layer 403 by total internal reflection. The user can follow the prompting message provided by the light-path steering element 405 and perform a touch gesture with his finger over the upper surface 401. The behavior of total internal reflection of the first light is interfered at the touch positions made by the user's finger and a light turned toward the light sensor is therefore formed. When the light sensor senses a series of the lights, an input data is formed by determining the touch events. With access control as an example, the input data acts as verification data that can be a set of security codes, or other security codes converted from a pattern or other data. The verification data can be used as a key for access control.

Figure 4B:
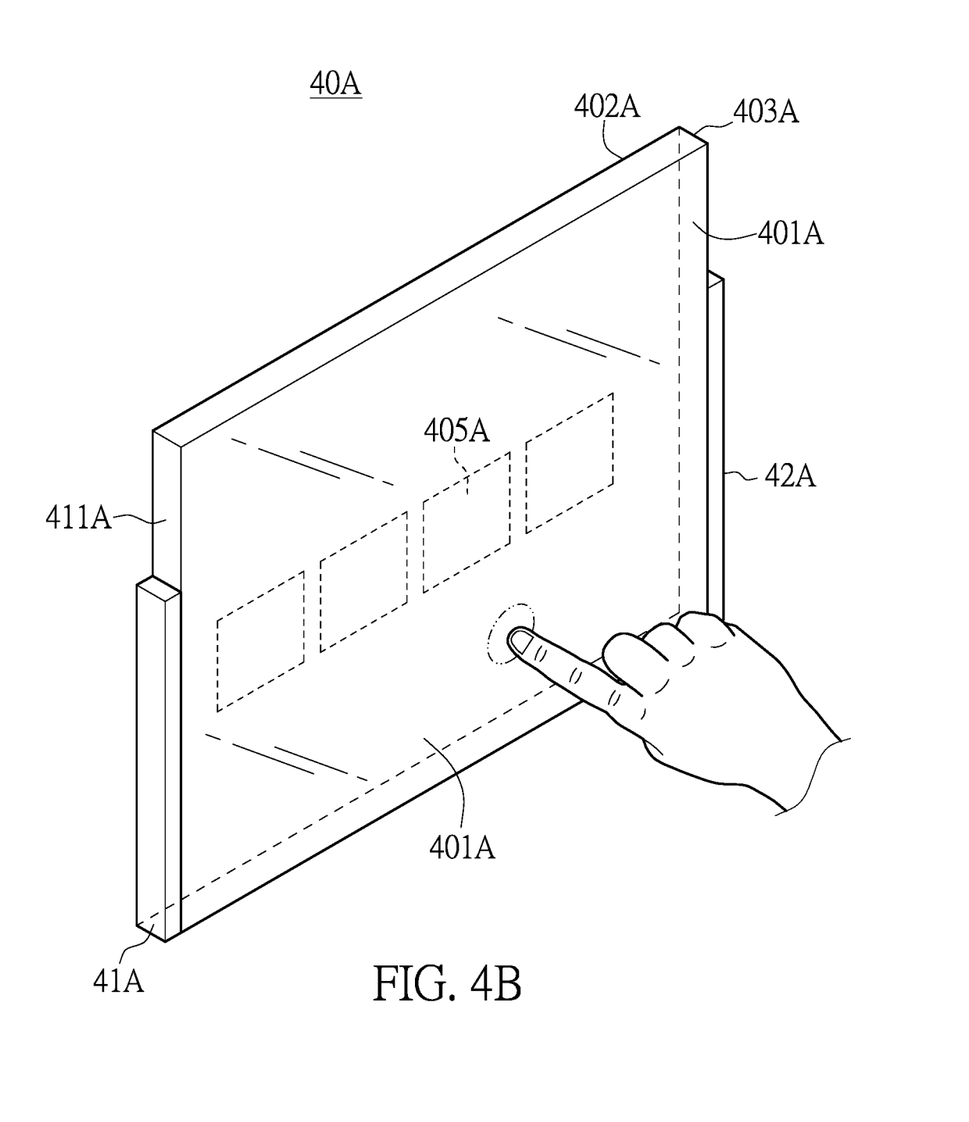
FIG. 4B is another schematic diagram depicting a light guide assembly according to one further embodiment of the disclosure.

FIG. 4B shows another schematic diagram depicting another light guide assembly which is modified from the light guide assembly of FIG. 4A.

A light guide assembly 40A is shown. The abovementioned first inner layer 403 and the second inner layer 404 are combined to form an inner layer 403A. The inner layer 403A is also disposed between an upper surface 401A and a lower surface 402A. A first light source 41A and a second light source 42A are respectively disposed on a left lateral surface 411A and a right lateral surface 412A of the inner layer 403A. The left lateral surface 411A and the right lateral surface 412A are opposite to each other across the inner layer 403A. The first light source 41A is used to emit a first light and the second light source 42A is used to emit a second light. The functions and purposes of the lights can be referred to in the description of FIG. 4A. A light-path steering element 405A is similarly disposed on the lower surface 402A or inside the inner layer 403A of the inner layer 403A. The operation of the light guide assembly can be referred to in FIG. 4A, and will not be reiterated herein.

Figure 5:
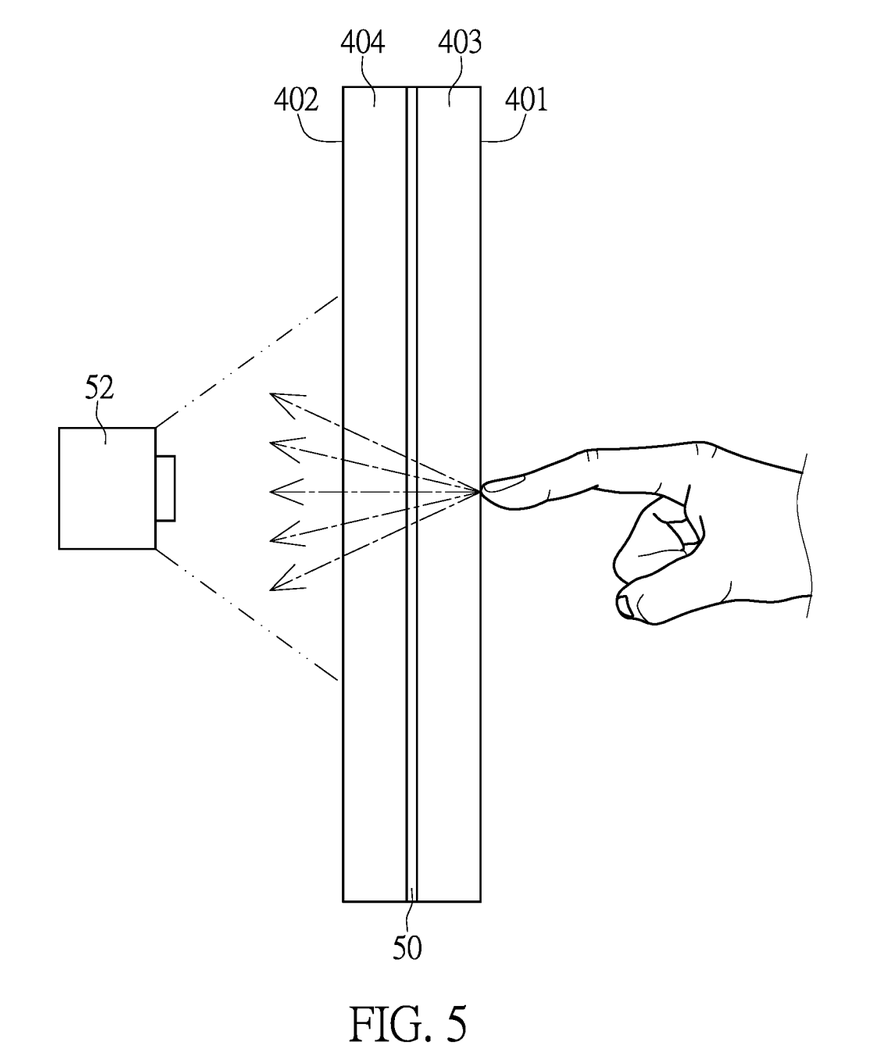
FIG. 5 shows a schematic diagram of an application of the light guide assembly in one embodiment of the disclosure.

FIG. 5 shows a schematic sectional view of the light guide assembly in one embodiment of the disclosure.

The main portion of the light guide assembly has two light guide elements, i.e., the above-mentioned first inner layer 403 and second inner layer 404. The two light guide elements further form the upper surface 401 and the lower surface 402. The two light guide elements are adhered to each other via a light-transmissive optical glue 50.

The second light propagates inside the second inner layer 404 and is provided for showing a visual effect that prompts a user to perform touch input over the upper surface 401. The visual effect can be used to guide the user to input a pattern or a text that forms the verification data. The first light propagates inside the first inner layer 403 for sensing a touch event. A reflective light caused by the touch input is emitted out via the lower surface 402. The reflective light is sensed by a light sensor 52 disposed outside the lower surface 402.

Figure 6:
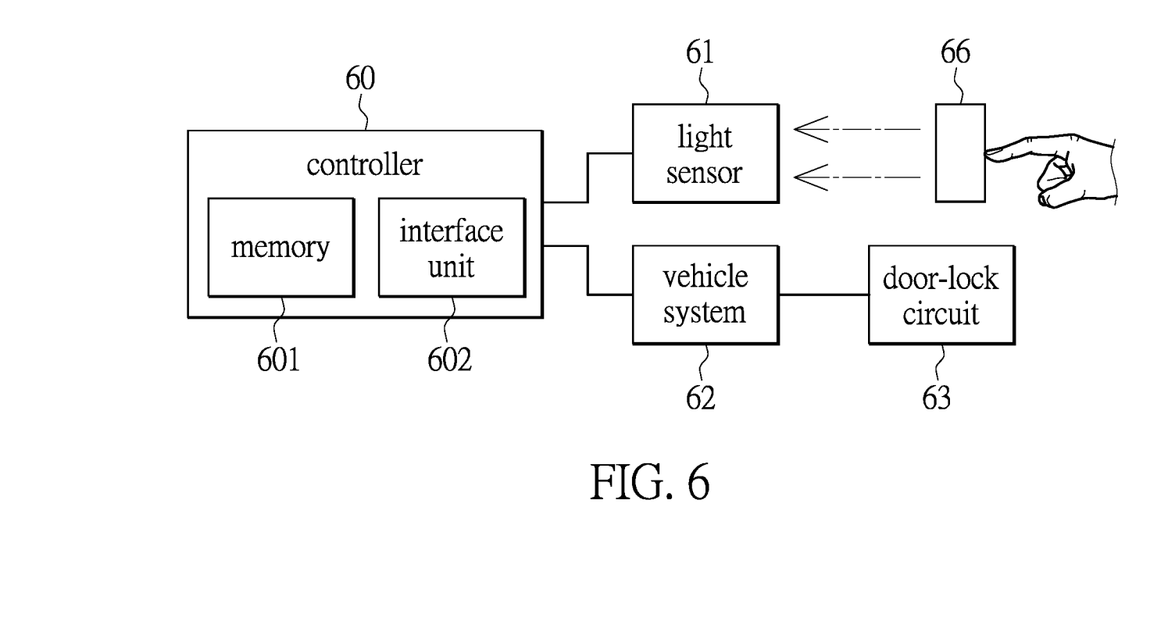
FIG. 6 is a schematic diagram depicting a circuitry of an access control system with the light guide assembly according to one embodiment of the disclosure.

FIG. 6 shows a block diagram depicting the access control system using the light guide assembly according to one embodiment of the disclosure.

The access control system uses a controller 60 to manage the electrical components for access control. The controller 60 is a control circuit in the access control system. The controller 60 includes a memory 601 used to store the requisite software routines for operating the system. The software routines are such as a routine for receiving data, a routine for comparison, and a routine for verification procedure. The memory 601 also stores the security verification data. The controller 60 includes an interface unit 602 that is used to connect with an external circuit, for example, to electrically connect with a light sensor 61. Furthermore, the controller 60 connects with a vehicle system 62 via an industrial standard connection.

The controller 60 is electrically connected with the light sensor 61 that can be the light sensor disposed inside a vehicle. The light sensor 61 is used to sense a reflective light that is generated when a user touches the light guide element of the light guide assembly 66. The controller 60 performs a verification procedure for access control according to a series of positions generated by one or more touch events performed by the user.

According to one of the embodiments of the disclosure, the position data with respect to the one or more touch events are specified to some positions such as the specific zones shown through the light-activation element. The above-mentioned embodiments show that the one or more touch events occur when any of the one or more specific zones is marked over the upper surface via the second light.

The controller 60 electrically connects with the vehicle system 62 so as to control a door-lock circuit 63. In a verification procedure for access control, once a user identity is successfully verified according to the one or more touch events, a message indicative of successful verification is generated and then transmitted to the vehicle system 62. Accordingly, the door-lock circuit 63 is driven to unlock the door. On the contrary, when the message indicates the user does not pass verification, the vehicle system 62 will not drive the door-lock circuit 63 to unlock the door.

The access control system and the vehicle system 62 are electrically connected. The system can therefore provide a variety of control procedures. For example, when the vehicle system 62 senses that one of the door handles is pulled up, some touch events are sensed. Alternatively, if one or more touch events are sensed by the light guide assembly 66, the controller 60 is informed for activating a light source of the light guide assembly 66 to light up the message shown on the light guide element. The message can guide a user to perform verification.

Further, the access control system provides various scenarios adapted to the vehicle. For example, when the vehicle stalls, the controller 60 is notified by the vehicle system 62. In the meantime, the vehicle system 62 drives the door-lock circuit 63 to lock the door if someone (e.g. a thief) is sensed in the vehicle, and the light guide element is lit up to ask for verification.

Figure 7:
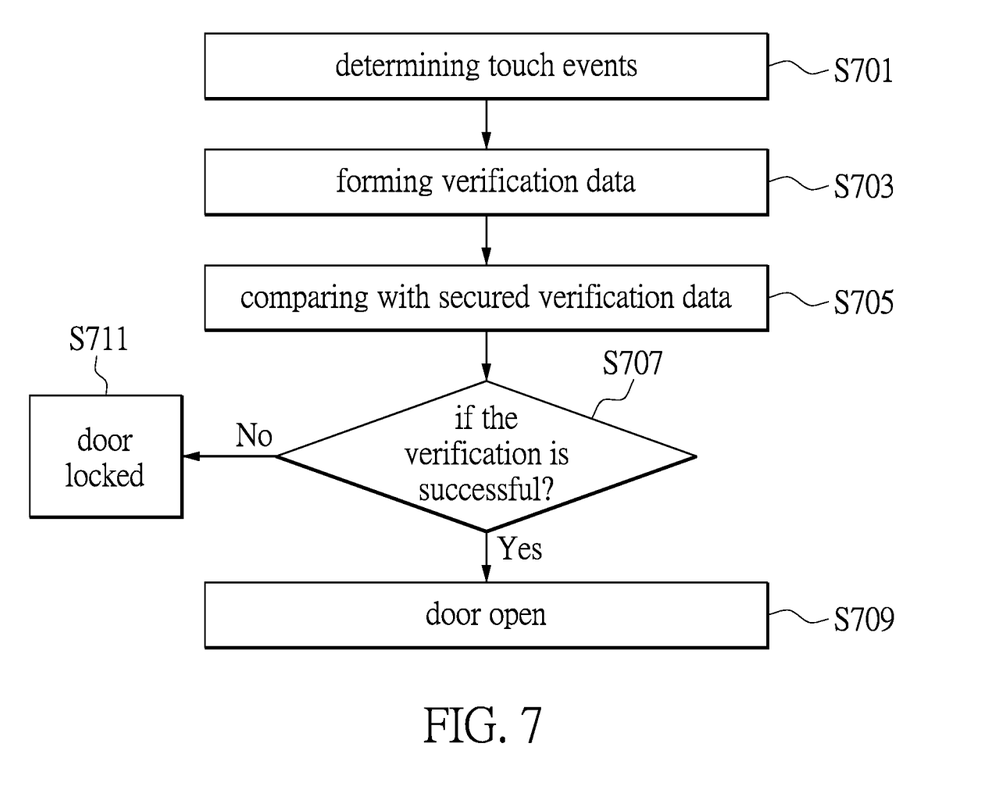
FIG. 7 shows a flow chart describing a verification procedure for access control performed by an access control device according to one embodiment of the disclosure.

FIG. 7 shows a flow chart that describes a verification procedure for access control performed by an access control device in one embodiment of the disclosure.

In step S701, in accordance with one embodiment of the access control system, the access control system determines a plurality of touch events via the light guide element. A plurality of touch positions are formed by a gesture, a pattern made by a stroke, or an alphanumeric combination performed by the user over the light guide element and converted into a plurality of coordinate positions. The touch events form the touch positions over the upper surface of the light guide element. In step S703, the coordinate positions corresponding to the touch positions so as to form a verification data. Next, in step S705, the controller of the access control system compares the verification data with a security verification data stored in a memory.

A comparison result obtained in step S705 determines whether or not the verification is successful. The controller controls the door-lock circuit according to the comparison result (step S707). Once the verification passes, the controller drives the door-lock circuit to open the door lock (step S709), for example, to drive the vehicle system to unlock the door of a vehicle. Otherwise, the door will not be unlock when the verification fails (step S711).

According to one embodiment of the disclosure, the control circuit of the access control device performs a verification procedure, e.g. identifying a gesture, a pattern made by a stroke, or an alphanumeric combination. In the procedure, the plurality of touch positions are converted to the plurality of coordinate positions. The features extracted from the gesture, the pattern made by a stroke, or the alphanumeric combination are compared with the security verification data (step S705).

The light guide assembly in accordance with the embodiments of the disclosure can be applied to an access control system used for security control in a vehicle. The light guide assembly is a structural portion of the access control system and can be applied to a transparent window of the vehicle.

Figure 8:
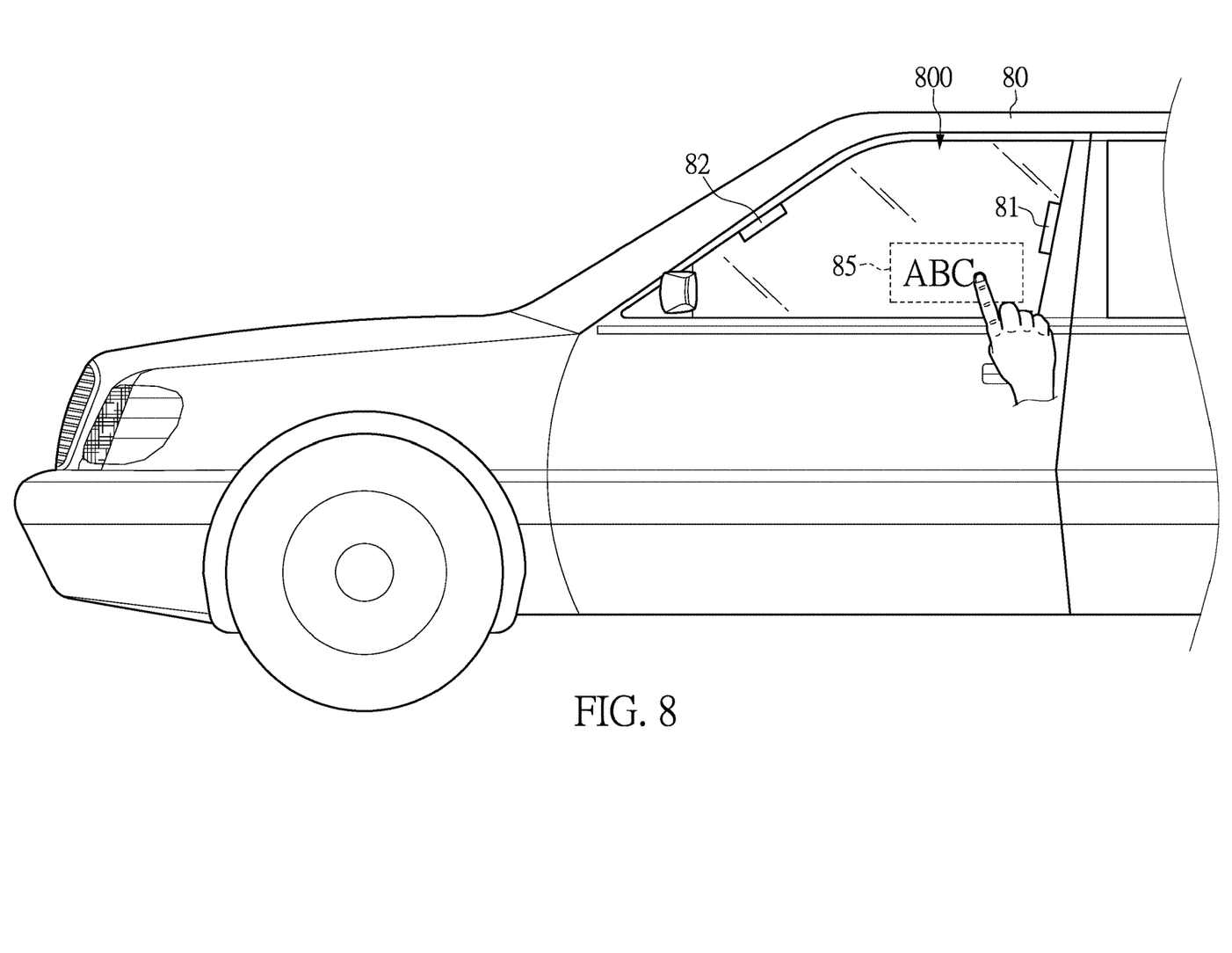
FIG. 8 is a schematic diagram depicting the access control system applied to a vehicle in one embodiment of the disclosure.

FIG. 8 schematically shows an access control system applied to a vehicle according to one of the embodiments of the disclosure.

In the present example, a vehicle 80 employs the access control system and a window of the vehicle is configured with a light guide assembly of the access control system. The main portion of the light guide assembly is a light guide element 800 that can be embodied by a whole or part of the window of the vehicle. The light guide element 800 allows a user to input a security code by touch input over the window. The security code can be formed by a gesture, a pattern made by a stroke, or an alphanumeric combination. The door can be unlocked if the verification procedure is passed.

A light source is disposed on a lateral surface of the light guide element 800. The light source is such as a first light source 81 used to produce a first light. The first light propagates inside the light guide element 800. In one of the embodiments of the disclosure, an inner layer of the light guide element 800 is made of a total-internal-reflection material that allows the first light to be propagated inside the inner layer by total internal reflection.

When a user of the vehicle 80 touches an upper surface of the light guide element 800 by his finger(s), one or more touch events occur over the upper surface. The behavior of total internal reflection at the touch positions of the light guide element 800 is interfered so as to make at least part of the first light propagating inside the light guide element 800 turn toward the interior of the vehicle 80. The first light enters the vehicle 80 via a lower surface of the light guide element 800. The first light is sensed by a light sensor inside the vehicle 80 so as to form a touch data.

Figure 9:
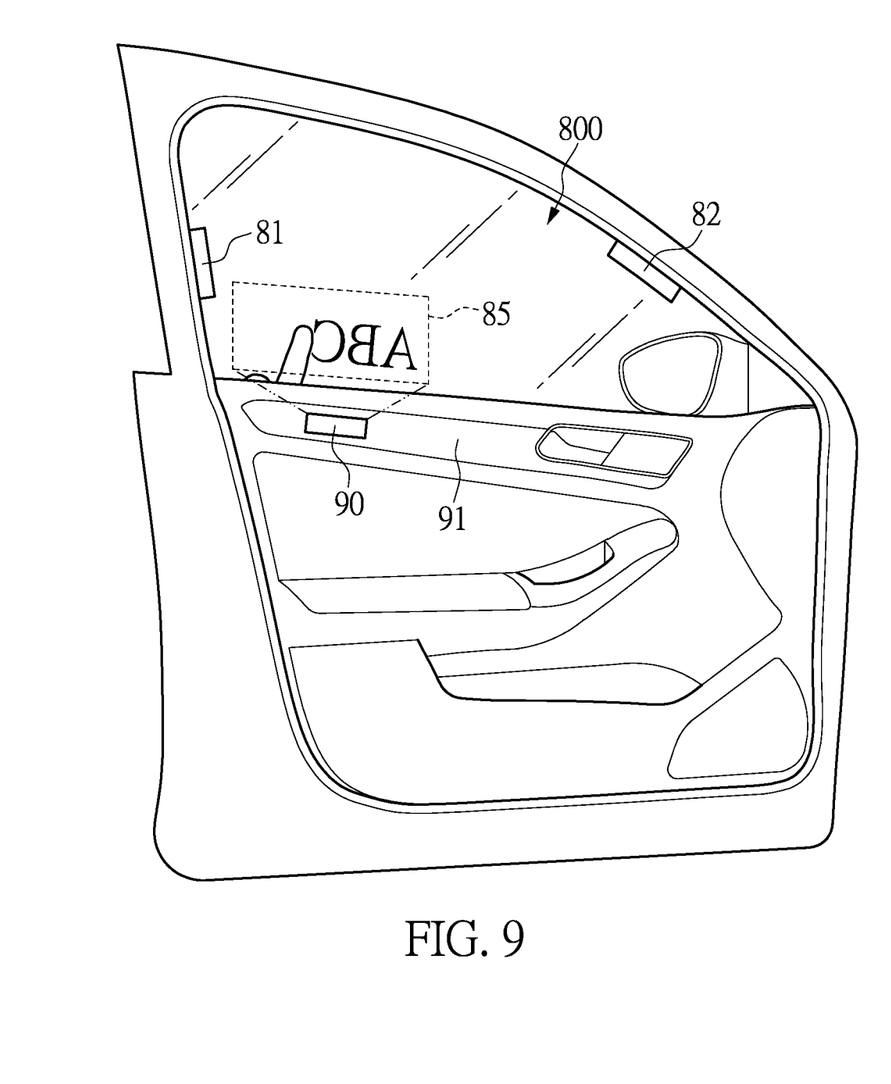
FIG. 9 is another schematic diagram depicting the access control system applied to a vehicle in another embodiment of the disclosure.

The access control system includes the light sensor such as that referred to in FIG. 9. The light sensor is disposed next to the lower surface of the light guide element 800. For example, the light sensor can be disposed near a driver's seat of the vehicle 80 for detecting the part of the first light reflected at the touch positions. The access control system can determine one or more positions with respect to one or more touch events occurring on the upper surface through the received first light.

According to the embodiment of the disclosure, the access control system further includes a second light source 82 for producing a second light propagating inside the light guide element 800. The second light source 82 can be disposed on one lateral side of the light guide element 800. The second light source 82 can be at the same or different lateral side of the first light source 81. A light-activation element 85 is disposed inside the light guide element 800. The light-activation element 85 can be arranged in a specific text or pattern. The light-activation element 85 is used to mark one or more specific zones over the upper surface near the user and reveal the one or more zones through the second light.

Thus, the user can follow the text (letters or numbers) or the pattern shown on the surface of the light guide element 800 through the second light to perform touch input. The one or more zones indicate a touch area for handwriting or indicate touch areas shown as buttons or a combination of alphanumeric patterns for the user to perform handwriting. The touch positions may reflect the first light propagating inside the light guide element 800, and the reflected light is sensed by the light sensor for obtaining the verification data. The verification data is provided for performing access control after identification.

It is worth mentioning that the access control system forms the verification data by the text or pattern shown on the light guide element. The verification data can be used as verification for opening the door lock, and also for verifying various control procedures. The user can set up many security verification data and each of the security verification data corresponds to a control procedure for unlocking the lock. For example, when the access control system identifies a first security verification data through comparison based on the touch data, the first security verification data may be used for opening the door lock at the driver's side. Further, when the access control system determines a second verification data through comparison, the second verification data may be used to control a lock of a trunk. Still further, when a third verification data is verified, the third verification data may be used to open all the locks. Further practical applications are not limited to those disclosed in the above embodiments.

FIG. 9 next shows another schematic diagram depicting the access control system applied to the vehicle in one embodiment of the disclosure.

Inside the vehicle 80, a whole or part of the window of the vehicle 80 is used as the light guide element 800 that allows the user to perform touch input by his gesture within the touch area formed by the light-activation element 85. The verification data is then generated. The related process for the touch input can be referred to in the description of the above embodiments and will not be reiterated herein.

In the present aspect, the light source includes a first light source 81 and a second light source 82 that propagate inside the light guide element 800 for forming the first light and the second light respectively. When the light passes through the position where the finger touches, at least part of the light is reflected and directed to the interior of the vehicle 80. According to the present embodiment, a light sensor 90 is disposed on a supporting structure 91 inside the vehicle 80. The light sensor 90 is configured to sense a certain range of the reflected lights. The control circuit of the access control system processes the touch data and converts the touch data into verification data. The verification data is used to compare with one of the security verification data.

In summary, the description of the above embodiments is related to a light guide assembly and an access control system using the light guide assembly. The light guide assembly not only provides a solution for verification by touch input, but also provides a visual effect through a light source disposed on a light guide element and the emitted light. Specifically, a visible light propagating inside the light guide by total internal reflection can be used to provide the visual effect through a light-activation material. A light sensor is used to identify the data from the touch input and the data can be used for access control. The light guide assembly allows the access control system to implement various verification methods, e.g. by a gesture, a handwriting pattern such as a signature or a symbol, or an alphanumeric combination made by a stroke, for the purpose of identity verification.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An access control system including a light guide assembly used as an interface for touch input, comprising:
   a light guide element having a lateral surface, an upper surface, a lower surface and an inner layer between the upper surface and the lower surface; wherein the lateral surface is used to receive a first light with a first wavelength, the first light propagates within the light guide element, and the first light is used to react a touch event occurring on the upper surface;
   a light-activation element disposed on the upper surface or inside the inner layer, used to receive the first light and convert the first light into a second light with a second wavelength, wherein the second wavelength is different from the first wavelength, and the second light is used to provide a visual effect;
   a light source disposed on a side of the lateral surface of the light guide element and used to provide the first light, wherein the inner layer is made of a total-internal-reflection material and the first light propagates by total internal reflection inside the inner layer; when the touch event occurs, at least a part of the first light is turned toward the lower surface; wherein the light-activation element is in a specific arrangement that allows the second light to mark one or more specific zones on the upper surface;
   a light sensor disposed on a side of the lower surface of the light guide element and used to detect the first light and determine positions with respect to one or more touch events according to the received first light; and
   a controller performing a verification procedure for an access control according to the positions with respect to the one or more touch events.

2. The system according to claim 1, wherein the inner layer is made of a total-internal-reflection material and the first light propagates by total internal reflection inside the inner layer; when the touch event occurs, at least a part of the first light is turned toward the lower surface.

3. The system according to claim 1, wherein the light-activation element is in a specific arrangement that allows the second light to mark one or more specific zones on the upper surface.

4. The system according to claim 3, wherein each specific zone specifies a specific digital character.

5. The system according to claim 1, wherein the light-activation element is made of photo-conversion nanomaterial that is used to absorb the first wavelength light and to produce light with the second wavelength.

6. The system according to claim 5, wherein the material for the light-activation element is NaYF4:Yb,Er or phosphor that is doped with a pattern on a surface of the light guide element, and the pattern is revealed on the surface of the light guide element once the material is activated.

7. The system according to claim 1, wherein the positions with respect to the one or more touch events are used to indicate one of the one or more specific zones marked on the upper surface by the second light in response to the one or more touch events.

8. The system according to claim 1, wherein the access control system is configured in a vehicle and the light guide assembly is disposed on a transparent window of the vehicle.

9. The system according to claim 1, wherein the verification procedure performed by the access control system includes:
   receiving touch positions from multiple touch events occurring on the upper surface;
   producing a plurality of coordinate positions in response to the multiple touch positions, and comparing the coordinate positions with a security verification data stored in a memory; and in response to a comparison result, an access control circuit is driven to unlock a door lock if the verification passes, or not to unlock the door lock if the verification fails.

10. The system according to claim 1, wherein the plurality of coordinate positions form a gesture, a pattern made by a stroke, or an alphanumeric combination, that is compared with the security verification data after extracting features therefrom.

* * * * *